Mar. 3, 1925.  
J. O. GOODWIN  
1,528,107  
METHOD AND APPARATUS FOR MAKING CELLULAR ARTICLES  
Filed Oct. 23, 1923
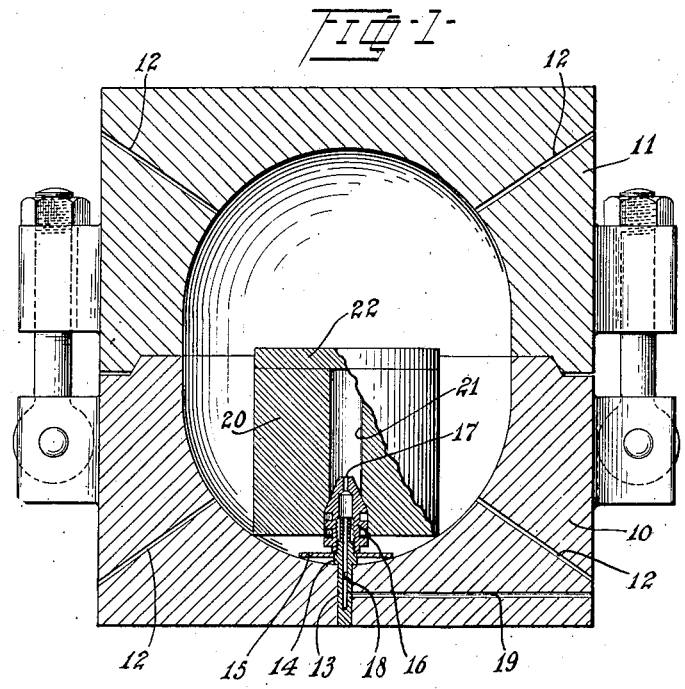
Fig-1-
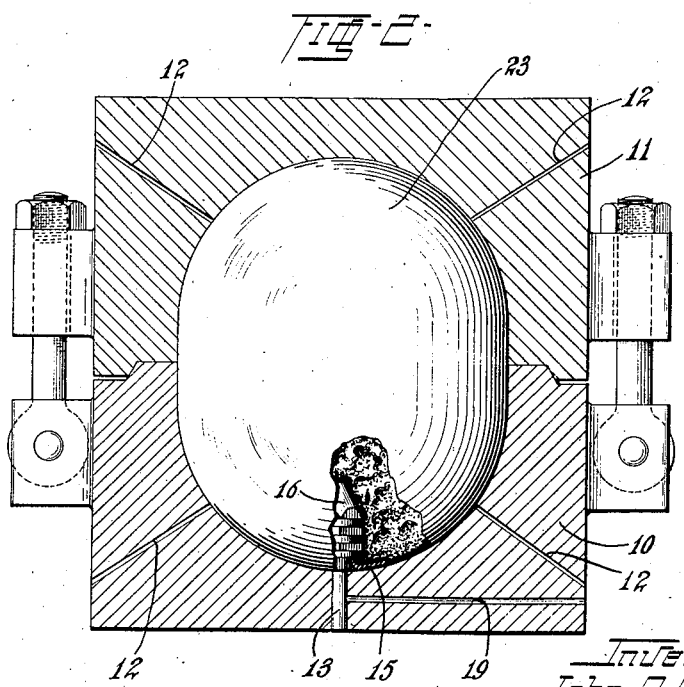
Fig-2-
Inventor,  
John O. Goodwin.  
By Robert M. Pierson  
Atty.

Patented Mar. 3, 1925.

1,528,107

UNITED STATES PATENT OFFICE.

JOHN O. GOODWIN, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING CELLULAR ARTICLES.

Application filed October 23, 1923. Serial No. 670,266.

*To all whom it may concern:*

Be it known that I, JOHN O. GOODWIN, a citizen of the United States, residing at Akron, in the county of Summit and State of Ohio, having invented a certain new and useful Method and Apparatus for Making Cellular Articles, of which the following is a specification.

This invention relates to cellular articles formed of a vulcanizable plastic such as rubber, and methods of making the same, and is especially applicable to floats, for example, such as are used to actuate the valves of flush tanks to determine the water level therein.

In the manufacture of such floats an internally threaded spud is customarily secured within the end of the float, for securing the latter to the operating lever of the valve structure. In the practice commonly followed heretofore, a solid cylindrical blank of uncured rubber stock was forced upon said spud and caused to flow about the latter during vulcanization. Irregularities of surface about the spud and imperfect joinder of the spud and rubber frequently occurred because of the imperfect flowing of the rubber and because of excessive amounts of air entrapped about the spud.

My general object is to provide improved procedure and apparatus for making articles of this character, and more particularly to obtain improved conformation of the rubber stock to the spud embedded therein and to the mold. A further object is to provide a method whereby the article may be vulcanized with less steam pressure and in less time than heretofore has been required.

Of the accompanying drawings:

Fig. 1 is a central section of a two part mold and the work therein, as they appear prior to the vulcanizing operation, in the practice of my invention, part of the rubber blank being shown in elevation.

Fig. 2 is a view similar to Fig. 1, showing the condition of the work after vulcanization, part of the vulcanized rubber body being broken away to show its cellular structure and its relation to the spud.

Referring first to Fig. 1, 10 and 11 are the lower and the upper sections respectively of a two part mold adapted for the vulcanization of tank floats, said sections being formed with the usual vents 12, 12 for permitting the escape of air from the mold cavity during the vulcanizing operation. The lower mold section 10 is also formed with a central aperture through its floor in which is secured a pin 13, which projects into the mold cavity, and is provided, just within the wall of the mold, with a shoulder 14 adapted to support an annular piece of fabric 15 mounted on said pin and adapted to be incorporated in the float, during the vulcanizing operation, as a reinforcement. The upper end of the pin 13, projecting into the mold cavity, is externally formed with a screw thread, upon which is screwed a spud 16, the latter being adapted to be incorporated in the tank float during vulcanization. Said spud is formed with an axial aperture 17, extending from its internally-threaded base aperture and opening onto the inner end face of the spud. The pin 13 is formed with an axial bore 18 extending from its upper end, where said bore is in communication with the axial aperture of the spud, to a point near the lower end of said pin, where it communicates with a passage 19 extending to the exterior of the lower mold section, the mold cavity thus being vented through the spud 16, pin 13 and passage 19 to the exterior of the mold. 20 is a cylindrical blank of sponge-rubber compound formed with an axial aperture 21 which receives the spud 16, and the upper end of said aperture is closed by a disc of sponge-rubber stock 22, overlying the entire upper end face of the blank 20 and stuck thereto.

The blank 20 is preferably formed by extruding a long length of stock from a tubing machine and then cutting it into short lengths represented by the blank 20. The disc 22 may be similarly formed or may be stamped from sheet stock.

In practicing my invention, the fabric washer or reinforcing member 15, preferably after being coated on its upper surface with rubber cement, is first mounted upon the pin 13 as shown in Fig. 1 and the spud 16 is screwed onto said pin as there shown. The blanks 20 and 22, being formed and stuck together as above described, are then mounted as shown, the central aperture 21 of the blank 20 receiving the spud 16 and permitting the cold stock to fit snugly about the spud nearly to the base of the latter. The upper mold section is then mounted and secured upon the lower, as shown in Fig. 1, and the mold with the work therein is surrounded by steam under pressure in a vulcanizer. When the steam pressure is built up in the latter, the steam enters the mold cavity through the vents 12 of the mold and also enters the aperture 21 in the blank 20, through the passage 19, pin 13 and spud 16. Hot steam is thus applied to both the interior and exterior of the blank, so that it is quickly heated. The heating of the blank causes it to soften and flow downward about the spud 16, and also activates the ingredients of the rubber compound which are employed to give the "blowing" action which results in the cellular character of the finished product, various blowing materials suitable for this practice being known in the art.

The blanks 20 and 22 promptly coalesce and quickly assume the expanded form shown in Fig. 2, the united cellular rubber structure, 23, completely filling the mold cavity, the force of the blowing substance, when activated by the initial heating of the mass, being sufficient to expel the air and steam from the mold cavity and from the aperture 21 of the blank, through the vents 12 and the passage 19. The mold with the work therein is permitted to remain in the vulcanizer until vulcanization is complete, the work then appearing as shown in Fig. 2, after which the finished article is unscrewed from the pin 13 and removed from the mold, and the operation as described is repeated.

The venting of the aperture 21 of the blank 20 through the spud 16 permits the air and steam to escape without passing over the outer surface of the spud and so preventing proper conformance and adhesion of the blank to the exterior of the spud. The forming of the blank with the aperture 21 permits the stock to be forced down over the spud prior to the vulcanizing operation, so that it is not indented by the spud as in prior practice, and is not required to flow through a very great distance during the vulcanizing operation. As the initial steam pressure is substantially as great within the aperture 21 as it is on the upper face of the disc 22, the latter is not forced away from the blank 20, and the disc 22, being of considerable thickness, forms a substantial closure for the aperture 21 even before the said aperture is eliminated by the blowing of the material. The time and temperature necessary for the complete vulcanization is reduced by the initial heating of the blank internally as well as externally, and a substantial increase in the output of a given mold equipment is thereby effected. Conformance of the stock to the spud 16 and to the mold about the base of the spud and adhesion of the stock to the latter, are greatly improved.

Modifications may be resorted to within the scope of my invention and I do not wholly limit my claims to the exact procedure described or to the specific construction shown.

I claim:

1. The method of making a cellular article of vulcanizable plastic material containing a blowing ingredient which comprises forming a hollow blank of said material, applying a heating fluid concurrently to the interior and exterior of said blank, whereby the blowing ingredient is activated, and externally confining the material as the latter is expanded by said blowing ingredient, while venting the interior of said blank so that the hollow thereof is substantially eliminated by the expansion of the material.

2. The method of making a sponge-rubber article having a metal insert which comprises forming a recessed blank of sponge-rubber stock adapted to receive said insert in the mouth of its recess, and heating the blank in a mold while venting said recess through said insert.

3. The method of making a sponge-rubber article having a metal insert which comprises forming a long, tubular length of sponge-rubber stock having an axial aperture of a size adapted snugly to receive said insert, severing a short length therefrom to form a blank, closing one end of said blank so formed, inserting the metal insert in the other end of said blank, and vulcanizing said blank while externally confining it and venting its hollow interior through said insert.

4. The method of making a sponge-rubber article having an insert embedded in the wall thereof, which comprises supporting the insert in the cavity of a mold, fitting onto said insert a hollow blank of sponge-rubber stock, admitting a heating fluid to the exterior of said blank through a wall of said mold, and to its interior through said insert, and vulcanizing said blank in said mold while venting the interior of said blank through said insert.

5. The method of making a sponge-rubber article having an insert embedded in the wall thereof which comprises tubing sponge-rubber stock to form a long, tubular length of stock having an aperture of a size snugly to receive said insert, severing a short length therefrom to form a blank, closing one end of the aperture in said blank with a separate piece of stock, forming said insert with a through aperture, fitting said insert into the opposite end of the aperture in said blank, and vulcanizing said blank while externally confining it and venting its hollow interior through the aperture of said insert.

6. Apparatus for molding a cellular article, said apparatus comprising a mold adapted to receive a hollow blank of stock and provided with means to vent the space external to said blank within the mold cavity, a wall of said mold being traversed by a fluid passage adapted to vent only the space within said hollow blank.

7. Apparatus for molding a cellular article having an insert in a wall thereof, said apparatus comprising a mold section traversed by a fluid passage, and an insert-support projecting into the mold cavity from said mold section and formed with a through aperture communicating with said passage and adapted to vent the interior of a hollow blank of moldable material associated with an insert mounted upon said insert-support.

8. Apparatus for molding a cellular article having a screw-threaded insert in a wall thereof, said apparatus comprising a mold section traversed by a fluid passage, and an insert-support projecting into the mold cavity from said mold section, formed with a through aperture communicating with said passage, and threaded complementally to receive said screw-threaded insert.

In witness whereof I have hereunto set my hand this 19th day of October, 1923.

JOHN O. GOODWIN.